(12) United States Patent
Yan et al.

(10) Patent No.: US 10,391,612 B2
(45) Date of Patent: Aug. 27, 2019

(54) ADDITIVE COMPOSITION AND COMPOSITION BINDING AGENT FOR SUPERHARD MATERIAL AND PREPARATION THEREOF, AND SELF-SHARPENING DIAMOND GRINDING WHEEL AND PREPARATION THEREOF

(71) Applicant: ZHENGZHOU RESEARCH INSTITUTE FOR ABRASIVES & GRINDING CO., LTD., Zhengzhou (CN)

(72) Inventors: Ning Yan, Zhengzhou (CN); Xin Han, Zhengzhou (CN); Junkai Niu, Zhengzhou (CN); Bo Xing, Zhengzhou (CN)

(73) Assignee: ZHENGZHOU RESEARCH INSTITUTE FOR ABRASIVES & GRIND, Zhengzhou (CN)

( * ) Notice: Subject to any disclaimer, the term of this patent is extended or adjusted under 35 U.S.C. 154(b) by 0 days.

(21) Appl. No.: 15/561,143

(22) PCT Filed: Apr. 27, 2017

(86) PCT No.: PCT/CN2017/082264
§ 371 (c)(1),
(2) Date: Sep. 25, 2017

(87) PCT Pub. No.: WO2017/211143
PCT Pub. Date: Dec. 14, 2017

(65) Prior Publication Data
US 2018/0185984 A1    Jul. 5, 2018

(30) Foreign Application Priority Data

Jun. 6, 2016 (CN) .......................... 2016 1 0395467
Jun. 6, 2016 (CN) .......................... 2016 1 0395488

(51) Int. Cl.
| | |
|---|---|
| B24D 3/04 | (2006.01) |
| B24D 3/34 | (2006.01) |
| C04B 35/00 | (2006.01) |
| C01D 7/00 | (2006.01) |
| C01G 9/02 | (2006.01) |
| C01B 32/28 | (2017.01) |
| C01B 33/12 | (2006.01) |
| C01B 35/10 | (2006.01) |
| C01F 11/22 | (2006.01) |
| C01G 29/00 | (2006.01) |
| C01G 39/06 | (2006.01) |

(52) U.S. Cl.
CPC ................ *B24D 3/04* (2013.01); *B24D 3/34* (2013.01); *C01B 32/28* (2017.08); *C01B 33/12* (2013.01); *C01B 35/1036* (2013.01); *C01D 7/00* (2013.01); *C01F 11/22* (2013.01); *C01G 9/02* (2013.01); *C01G 29/00* (2013.01); *C01G 39/06* (2013.01); *C04B 35/00* (2013.01); *C01P 2002/30* (2013.01); *C01P 2004/45* (2013.01)

(58) Field of Classification Search
CPC ........... B24D 3/04; C01B 32/28; C01B 33/12; C01B 35/1036; C01F 11/22; C04B 35/00; C01P 2002/30; C01P 2004/45
See application file for complete search history.

(56) References Cited

U.S. PATENT DOCUMENTS

| | | | | |
|---|---|---|---|---|
| 2003/0045213 A1* | 3/2003 | Keipert | ................... | B24D 3/32 451/57 |
| 2008/0090034 A1* | 4/2008 | Harrison | ................ | B41M 5/385 428/32.71 |
| 2008/0185962 A1* | 8/2008 | Kato | ...................... | C03C 3/066 313/586 |
| 2011/0143641 A1* | 6/2011 | Ramanath, Sr. | ......... | B24D 7/06 451/548 |
| 2012/0220442 A1* | 8/2012 | Ogino | .................... | C03C 3/062 501/37 |

FOREIGN PATENT DOCUMENTS

CN           103831740           4/2016

* cited by examiner

*Primary Examiner* — Pegah Parvini
(74) *Attorney, Agent, or Firm* — Hogan Lovells US LLP

(57) ABSTRACT

Disclosed are an additive raw material composition and an additive for superhard material product, a method for preparing the additive, a composite binding agent, a superhard material product, a self-sharpening diamond grinding wheel and a method for manufacturing the same. The raw material composition consisting of components in following mass percentage: $Bi_2O_3$ 25%~40%, $B_2O_3$ 25%~40%, ZnO 5%~25%, $SiO_2$ 2%~10%, $Al_2O_3$ 2%~10%, $Na_2CO_3$ 1%~5%, $Li_2CO_3$ 1%~5%, $MgCO_3$ 0%~5%, and $CaF_2$ 1%~5%. The composite binding agent is prepared from the additive and a metal composite binding agent. The self-sharpening diamond grinding wheel prepared from the composite binding agent has high self-sharpness, high strength, and fine texture, is uniformly consumed during the grinding process, does not need to be trimmed during the process of being used, and maintains good grinding force all the time, fundamentally solving the problems of long trimming time and high trimming cost of the diamond grinding wheel.

4 Claims, 2 Drawing Sheets

ADDITIVE COMPOSITION AND COMPOSITION BINDING AGENT FOR SUPERHARD MATERIAL AND PREPARATION THEREOF, AND SELF-SHARPENING DIAMOND GRINDING WHEEL AND PREPARATION THEREOF

The present application claims priority to PCT patent application No. PCT/CN2017/082264 filed on Apr. 27, 2017, entitled "Additive Raw Material Composition and Additive for Superhard Material Product, Preparation Method of the Additive, Composite Binding Agent and Superhard Material Product, Self-Sharpening Diamond Grinding Wheel and Preparation Method of the Same", and priority to Chinese patent application No. CN2016 10395467.X filed with SIPO on Jun. 6, 2016, entitled "Additive Raw Material Composition and Additive for Superhard Material Product, Preparation Method of the Additive, Composite Binding Agent and Superhard Material Product", and priority to Chinese patent application No. CN201610395488.1 filed with SIPO on Jun. 6, 2016, entitled "A Self-Sharpening Diamond Grinding Wheel and Preparation Method of the same", which are incorporated herein by reference in their entirety.

TECHNICAL FIELD

The present invention belongs to the technical field of superhard material product, and particularly relates to an additive raw material composition for superhard material product. The invention also relates to an additive for superhard material product made from the additive raw material composition and a preparation method of the same. The invention also relates to a composite binding agent containing the additive. The invention further relates to a grinding wheel using the composite binding agent and a preparation method of the same, and specifically relates to an additive raw material composition and an additive for superhard material product, and a preparation method of the additive, a composite binding agent and a superhard material product to provide a self-sharpening diamond grinding wheel and a preparation method of the same.

BACKGROUND ART

Superhard materials mainly refer to diamond and cubic boron nitride, whose hardness is far higher than that of other materials. Superhard materials and products thereof are an emerging industry strongly supported by the nation. It is pointed out in Chinese "Twelfth Five-Year" Development Plan for National Strategic Emerging Industries that new functional materials should be vigorously developed, and high-purity graphite, artificial crystals, superhard materials and products thereof should be actively developed. According to the difference of types of binding agents, the superhard material products mainly include: superhard material products with metal binding agents, superhard material products with ceramic binding agents, superhard material products with resin binding agents, superhard material products with electroplated metal binding agents and so on.

As one of the main types of superhard material products, the superhard material products with metal binding agents have the advantages such as strong holding force to abrasive, high strength, good abrasion resistance, good performance of maintaining the shape of a working face, and long service life, and are widely applied to cutting, grinding and shaping and grinding-processing of inorganic non-metal hard and brittle materials such as stones, glasses, ceramics and artificial crystals. However, diamond products with metal binding agents have the problems such as poor self-sharpness, easy blockage, and low grinding efficiency, which limit their use and development.

With regard to the problems of the superhard material products with metal binding agents, numerous investigations and attempts have been made by scholars, primarily adding barren materials including graphite, ceramic, and iron oxide as additive. However, if an excessive quantity of these additives is added, the strength of an abrasive layer and the holding force of the binding agents to the abrasive will be severely reduced, significantly decreasing the service life and easily causing scratches; if the quantity added is too little, the function of improving the grinding performance and the grinding efficiency is not significant.

For example, in the prior art, a superhard abrasive grinding wheel with metal binding agent, which can be subjected to on-line electrolysis, is manufactured by a cold pressing sintering method. One or two additives from graphite and ferroferric oxide, which are used in the superhard abrasive grinding wheel as non-metal additive, have a small adhering function and relatively low strength (being quite different from the metal binding agent in strength), and are unfavorable to keeping the strength of the abrasive layer and the holding force to the abrasive.

Self-sharpness of grinding wheel means that when abrasive grains of the grinding wheel are blunted, the grinding force is also increased accordingly, so that the abrasive grains are broken or fall down, and sharp cutting edges appear again. During the process of grinding of the superhard material product grinding wheel, edges and corners of the abrasive grains of the grinding wheel are gradually rounded and blunted under the effects of friction and extrusion, and abrasive debris is often stuck on the surface of the grinding wheel so that the surface of the grinding wheel is blocked, and finally the grinding wheel loses the grinding ability. At this time, skidding will occur between the grinding wheel and a workpiece, and vibration may be induced and noise may appear, so that the grinding efficiency is decreased and the surface roughness becomes worse. Meanwhile, as the grinding force and the grinding heat are increased, the workpiece will be deformed and the grinding accuracy will be affected, and in severe cases the grinding surface will be burnt and tiny cracks will appear thereon. At this time, the grinding wheel has to be trimmed with a trimmer. The grinding wheel usually needs to be trimmed for tens of minutes or even several hours, severely affecting the manufacturing steps and lowering the producing efficiency; the trimmer is expensive, and the cost is high. In high-accuracy grinding, a machine tool needs to be further equipped with an in-process trimming device, which also increases the design difficulty and manufacturing cost of the machine tool. In the prior art, improvement on the self-sharpness of the diamond grinding wheel is merely limited to improvement on trimming gap, while the problems of long time and high cost of trimming the grinding wheel still cannot be solved. The grinding wheel with the composite binding agent uses a composite binding agent made from ceramic powder and bronze powder, but the ceramic powder, having a relatively high level of fire resistance, needs to be smelted at 1700° C., which is higher than the sintering temperature of the grinding wheel, and the ceramic powder is not easy to disperse uniformly during the sintering process, having limited function in improving the grinding efficiency and the service life of the grinding wheel.

DISCLOSURE OF THE INVENTION

One of the objects of the present invention is to provide an additive raw material composition for superhard material product, wherein the difference between the strength of the obtained additive and that of the metal binding agent is small, and the obtained additive has a low level of fire resistance, and can remarkably improve the grinding efficiency and the service life of the superhard material product with the metal binding agent.

Another object of the present invention is to further provide an additive for superhard material product made by the above additive raw material composition and a preparation method thereof, and a composite binding agent containing the additive and a superhard material product using the composite binding agent.

Another object of the present invention is to further provide a self-sharpening diamond grinding wheel and a preparation method thereof.

In order to achieve the above objects, technical solutions used in the present invention are as follows:

an additive raw material composition for superhard material product consisting of components in a mass percentage as follows:

$Bi_2O_3$ 25%~40%, $B_2O_3$ 25%~40%, ZnO 5%~25%, $SiO_2$ 2%~10%, $Al_2O_3$ 2%~10%, $Na_2CO_3$ 1%~5%, $Li_2CO_3$ 1%~5%, $MgCO_3$ 0%~5%, and $CaF_2$ 1%~5%.

In the above raw material composition, the purity of each of the raw materials is analytically pure.

An additive for superhard material product is made from raw materials in a mass percentage as follows:

$Bi_2O_3$ 25%~40%, $B_2O_3$ 25%~40%, ZnO 5%~25%, $SiO_2$ 2%~10%, $Al_2O_3$ 2%~10%, $Na_2CO_3$ 1%~5%, $Li_2CO_3$ 1%~5%, $MgCO_3$ 0%~5%, and $CaF_2$ 1%~5%.

The particle size of the additive is D90<200 nm.

A method for preparing the above additive includes the steps of:

1) mixing $Bi_2O_3$, $B_2O_3$, ZnO, $SiO_2$, $Al_2O_3$, $Na_2CO_3$, $Li_2CO_3$, and $MgCO_3$ of a formula ratio, heating up to 1200~1400° C. and keeping the temperature for 1~3 hours to provide a mixture;

2) cooling the mixture obtained in Step 1) to 850~950° C., adding $CaF_2$ of the formula ratio to the mixture, and keeping the temperature for 1~2 hours to provide a sinter;

3) quenching the sinter obtained in Step 2) and then crushing the quenched sinter to make the quenched sinter in a particle size of D90<200 nm to provide the additive.

A composite binding agent consists of a metal binding agent and the above additive. The content of mass percentage of the additive in the composite binding agent is no more than 30%. In one embodiment, the content of mass percentage of the additive in the composite binding agent is 1.1%~30%.

A superhard material product uses the above composite binding agent; optionally, the superhard material product is a grinding wheel. In this grinding wheel, the weight of the additive is 1%~10% of the total weight of the raw materials of the grinding wheel. The raw materials of the grinding wheel include the composite binding agent and an abrasive.

A self-sharpening diamond grinding wheel includes an abrasive block. Raw materials of the abrasive block include a metal binding agent, $MoS_2$, SG abrasive, diamond and the above additive; the mass percentage of the above additive in the raw materials of the abrasive block is 1%~10%.

A method for manufacturing the above self-sharpening diamond grinding wheel includes the steps of:

a) mixing a metal binding agent, $MoS_2$ powder, SG abrasive, diamond and additive to provide a mixture;

b) placing the mixture obtained in Step a) in a mold and pressing the mixture to provide a semi-finished product;

c) placing the semi-finished product obtained in Step b) in a mold, heating up to 580~620° C. and keeping the temperature for 4~10 min for sintering, followed by quenching, to provide the abrasive block.

The method for manufacturing the self-sharpening diamond grinding wheel further includes adhering the obtained abrasive block on a grinding wheel substrate to provide the self-sharpening diamond grinding wheel.

In the additive raw material composition for superhard material product of the present invention, $Bi_2O_3$, $B_2O_3$, ZnO, $SiO_2$, $Al_2O_3$, $Na_2CO_3$, $Li_2CO_3$, and $MgCO_3$ are used for compounding with $CaF_2$, and the components coordinate and cooperate with each other; the additive made from the raw material composition has a microcrystalline structure, and its strength is greater than 200 MPa, which is not quite different from the metal bonding agent in strength, and will not remarkably lower the strength of the superhard material product with the metal binding agent; the level of fire resistance of the additive is lower than 500° C., which is far lower than the sintering temperature of the superhard material product with the metal binding agent, and when the superhard material product with the metal binding agent is sintered, the additive is in a molten state, and is radially distributed between particles of the skeleton after the sintering; the additive, whose particle size reaches a submicron level, is uniformly dispersed in the product with fine texture, has less influence on the overall strength of the product, and can remarkably improve the grinding efficiency and the service life of the superhard material product with the metal binding agent.

The method for preparing additive for superhard material product of the present invention is mixing and smelting $Bi_2O_3$, $B_2O_3$, ZnO, $SiO_2$, $Al_2O_3$, $Na_2CO_3$, $Li_2CO_3$, and $MgCO_3$, then cooling and adding $CaF_2$ to the mixture, keeping the temperature, and then quenching and crushing to provide the additive; the additive obtained has a microcrystalline structure, high strength, low fire resistance, and small particle size; this preparation method has a simple process, is easy to operate, and is suitable to large-scale industrialized manufacturing.

The additive shows uniformly diffused radial distribution of a submicron level in the composite binding agent. The additive is compounded with a metal binding agent to form a composite binding agent. A superhard material product using the composite binding agent has less influence on the strength of the metal binding agent, improves the sharpness and service life of the product, and enhances the grinding performance of the product.

In the self-sharpening diamond grinding wheel of the present invention, raw materials of the abrasive block include a metal binding agent, $MoS_2$, SG abrasive, diamond and additive. The additive is made from certain amounts of $Bi_2O_3$, $B_2O_3$, ZnO, $SiO_2$, $Al_2O_3$, $Na_2CO_3$, $Li_2CO_3$, $MgCO_3$ and $CaF_2$; the additive has a microcrystalline structure, and its strength is greater than 200 MPa. The difference between the strength of the additive and that of the metal binding agent is small; the fire resistance of the additive is lower than 500° C., far lower than the sintering temperature of the superhard material product with the metal binding agent. The additive is in a molten state when being sintered, is radially distributed between particles of the skeleton after the sintering, and is uniformly dispersed with fine texture.

In the self-sharpening grinding wheel of the present invention, the coefficient of linear expansion of the additive used matches well with the diamond; the additive shows uniformly diffused radial distribution of a submicron level in the grinding wheel, has less influence on the overall strength of the grinding wheel, and can remarkably improve the self-sharpness and service life of the diamond grinding wheel with a metal binding agent; the $MoS_2$ powder has a stable chemical property and a very strong adhesion force between metals, has a lubrication function, and also serves an anti-oxidation function in powders; the SG abrasive has the functions of site-occupying and assisting the grinding in the grinding wheel, prevents the grinding wheel from being blocked, and meanwhile can improve the performance of maintaining the shape of the diamond grinding wheel, and thus avoids loss of accuracy of shape of the grinding wheel. The self-sharpening grinding wheel of the present invention, with the abrasive block taking a metal binding agent, SG abrasive, diamond and the above additive as raw materials, has high self-sharpness, high strength, high processing efficiency, and fine texture, is uniformly consumed during the grinding process, and does not need to be trimmed during its operational life cycle. Moreover, during the grinding process, it maintains good grinding force all the time, fundamentally solving the problems of long trimming time and high trimming cost of the diamond grinding wheel, and possessing good economic benefit.

Further, the self-sharpening diamond grinding wheel of the present invention uses the metal binding agent made from certain amounts of Cu powder, Sn powder, Co powder, Al powder, Fe powder, Cr powder, and Ti powder; in the metal binding agent, the Al powder, which has a relatively high activity, is quite easy to oxidize, can preferentially react with oxygen in air during the sintering process, so as to prevent oxidization of other metal powders and diamond, thus the sintering process can be carried out in an air atmosphere, greatly reducing the cost; the Cr powder and the Ti powder can form carbides with the abrasive, improving the adhering strength of the diamond plated with the binding agent.

In the method for manufacturing the self-sharpening diamond grinding wheel of the present invention, the raw materials are mixed, then the mixture is firstly pressed into a semi-finished product in a mold, and then sintered; after the hot pressing sintering, the mold is quickly placed in water to be quenched, which can prevent the crystal grains from growing excessively, so that the grinding wheel has a fine texture, thus a diamond grinding wheel with high strength and high self-sharpness is obtained. Moreover, the grinding wheel is uniformly consumed during the grinding process. This manufacturing method has a simple process, easy operation, low sintering temperature, and low cost, and is easy to be controlled automatically and suitable to large-scale industrialized manufacturing.

BRIEF DESCRIPTION OF DRAWINGS

In order to more clearly illustrate technical solutions of examples of the present invention, figures which are needed in the examples will be introduced briefly below. It should be understood that the figures below merely show some examples of the present invention, and therefore should not be considered as limiting the scope. A person ordinarily skilled in the art still can obtain other relevant figures according to these figures, without expending inventive effort.

DETAILED DESCRIPTION OF EMBODIMENTS

Figure 1:
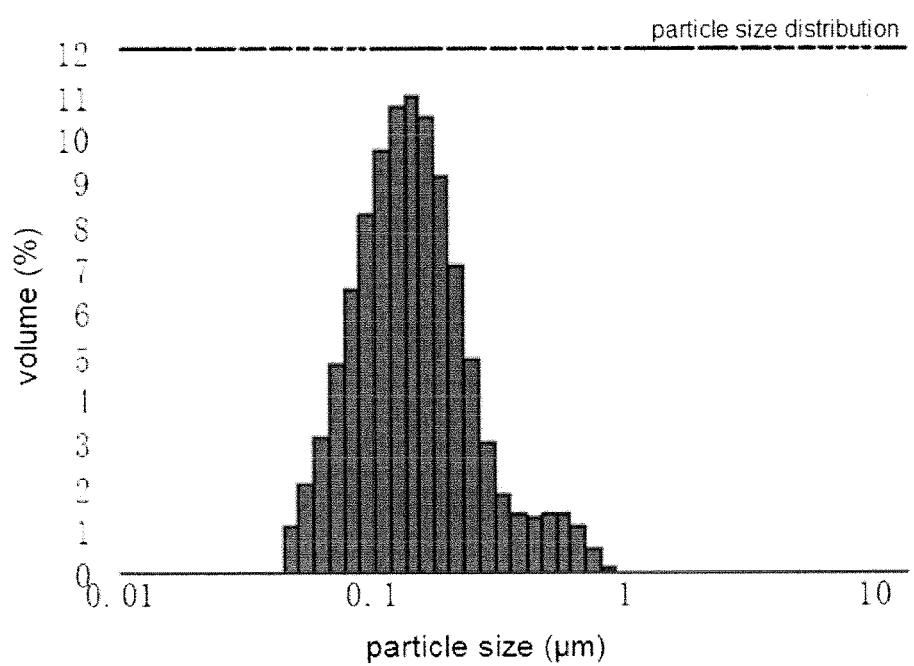
FIG. 1 is a diagram of distribution of particle size of an additive for a superhard material product obtained in Example 1.

Below, the present invention is further described with reference to several embodiments.

An additive raw material composition for superhard material product consists of components in a mass percentage as follows:

$Bi_2O_3$ 25%~40%, $B_2O_3$ 25%~40%, ZnO 5%~25%, $SiO_2$ 2%~10%, $Al_2O_3$ 2%~10%, $Na_2CO_3$ 1%~5%, $Li_2CO_3$ 1%~5%, $MgCO_3$ 0%~5%, and $CaF_2$ 1%~5%.

In the above raw material composition, the purity of respective raw materials is analytically pure.

An additive for superhard material product is made from raw materials in a mass percentage as follows:

$Bi_2O_3$ 25%~40%, $B_2O_3$ 25%~40%, ZnO 5%~25%, $SiO_2$ 2%~10%, $Al_2O_3$ 2%~10%, $Na_2CO_3$ 1%~5%, $Li_2CO_3$ 1%~5%, $MgCO_3$ 0%~5%, and $CaF_2$ 1%~5%.

Optionally, the particle size of the additive is D90<200 nm.

A method for preparing the above additive includes the steps of:

1) mixing $Bi_2O_3$, $B_2O_3$, ZnO, $SiO_2$, $Al_2O_3$, $Na_2CO_3$, $Li_2CO_3$, and $MgCO_3$ of a formula ratio, heating up to 1200~1400° C. and keeping the temperature for 1~3 hours to provide a mixture;

2) cooling the mixture obtained in Step 1) to 850~950° C., adding $CaF_2$ of the formula ratio to the mixture, and keeping the temperature for 1~2 hours to provide a sinter;

3) quenching the sinter obtained in Step 2) and then crushing the quenched sinter to make the quenched sinter in a particle size of D90<200 nm to obtain the additive.

Optionally, in Step 1), a rate of the heating is 8~12° C./min. The mixed raw materials are put in a quartz crucible, and placed in a high-temperature resistance furnace to be heated.

Optionally, in Step 2), a rate of the cooling is 4~6° C./min.

Optionally, in Step 3), the quenching refers to quenching the obtained sinter in water, to provide a bulk material. The water preferably is water at a room temperature.

Optionally, the crushing in Step 3) refers to mixing the obtained bulk material with ethanol and ball-milling them. The bulk material is put into a ball-mill tank together with ethanol to be ball-milled on a high-energy ball-milling machine; they are ball-milled until the obtained powder has a particle size of D90<200 nm; optionally, the ball-milling time is 40~60 hours. Optionally, a volume ratio of the material to ethanol is 1:3.

The composite binding agent consists of a metal binding agent and the above additive. The content of mass percentage of the additive in the composite binding agent is no more than 30%. In one embodiment, the content of mass percentage of the additive in the composite binding agent is 1.1%~30%.

Optionally, the metal binding agent is a bronze binding agent or a Co-based binding agent.

A superhard material product uses the above composite binding agent; the superhard material product is a grinding wheel. In the grinding wheel, the weight of the additive is 1%~10% of the total weight of the raw materials of the grinding wheel. The raw materials of the grinding wheel include the composite binding agent and an abrasive. Preferably, the abrasive is a diamond abrasive.

The self-sharpening diamond grinding wheel includes an abrasive block. Raw materials of the abrasive block include a metal binding agent, $MoS_2$, SG abrasive, diamond and the above additive; the content of mass percentage of the above additive in the raw materials of the abrasive block is 1%~10%.

A method for manufacturing the above self-sharpening diamond grinding wheel includes the steps of:

a) mixing the metal binding agent, the $MoS_2$ powder, the SG abrasive, the diamond and the additive to provide a mixture;

b) loading the mixture obtained in Step a) in a mold and pressing the mixture to provide a semi-finished product;

c) placing the semi-finished product obtained in Step b) in a mold, heating up to 580~620° C. and keeping the temperature for 4~10 min for sintering, followed by quenching, to provide the abrasive block.

Optionally, in Step a), the mixing includes pouring the raw materials in a three-dimensional mixer to mix the materials for 2~4 hours.

Optionally, in Step b), a pressure of the pressing is 150~200 MPa. The mold used in the pressing preferably is a steel mold; the device used in the pressing preferably is an oil hydraulic press.

Optionally, in Step c), the heating refers to firstly heating up to 350~450° C. at a heating rate of 100° C./min and keeping the temperature for 1~3 min, and then heating up to 580~620° C. at a heating rate of 50° C./min. The function of firstly heating up to 350~450° C. and keeping the temperature is to promote the complete melting of Sn with a low melting point, so as to perform alloying reaction.

Optionally, in Step c), the mold used in the sintering preferably is a graphite mold; the device used in the sintering preferably is a hot pressed sintering machine. The sintering process can be carried out in an air atmosphere. After completing the sintering by keeping the temperature at 580~620° C., the mold is placed in water to be quenched. The water preferably is water at a room temperature.

Optionally, the method for preparing the self-sharpening diamond grinding wheel further includes adhering the obtained abrasive block on a grinding wheel substrate to obtain the self-sharpening diamond grinding wheel.

In the embodiments, all the raw materials used in the raw material composition are analytically pure.

EXAMPLE 1

An additive raw material composition for superhard material product in the present example consists of components of mass percentage as follows:

$Bi_2O_3$ 35%, $B_2O_3$ 35%, ZnO 10%, $SiO_2$ 5%, $Al_2O_3$ 3%, $Na_2CO_3$ 2%, $Li_2CO_3$ 4%, $MgCO_3$ 2%, and $CaF_2$ 4%.

An additive for superhard material product in the present example is made from the above raw material composition, and a method for preparing the additive includes the steps of:

1) mixing $Bi_2O_3$, $B_2O_3$, ZnO, $SiO_2$, $Al_2O_3$, $Na_2CO_3$, $Li_2CO_3$, and $MgCO_3$ of a formula ratio and evenly mixing them, then pouring the mixture in a quartz crucible, and placing the quartz crucible in a high-temperature resistance furnace to be heated at a rate of 10° C./min to 1250° C. and keeping the temperature for 2 hours to provide a mixture;

2) cooling the mixture obtained in Step 1) to 850° C. at a rate of 5° C./min, adding $CaF_2$ of the formula ratio to the mixture and stirring, and keeping the temperature for 2 hours to provide a sinter;

3) pouring the sinter obtained in Step 2) into cold water to be quenched to provide a bulk material; putting the obtained bulk material and ethanol, at a volume ratio of 1:3 of the material to ethanol, into a ball-mill tank to be ball-milled on a high-energy ball-milling machine for 60 hours, to obtain a powder, i.e. the additive, having a particle size of D90<200 nm (the particle size of the powder was detected via a laser particle analyzer, and the particle size distribution was as shown in FIG. 1).

The composite binding agent in the present example consists of a metal binding agent and the above additive. The content of mass percentage of the additive in the composite binding agent is 10%. The metal binding agent is a bronze binding agent, and consists of components of mass percentage as follows: Cu powder 71%, Sn powder 21%, Co powder 7%, and Ni powder 1%.

The grinding wheel in the present example was made by evenly mixing the above composite binding agent with a diamond abrasive, followed by pressing the mixture at 150 MPa into a semi-finished product, and then placing the semi-finished product in a corresponding mold to be subjected to sintering at 580° C. The weight of the additive is 8% of the total weight of the raw materials of the grinding wheel (the composite binding agent and the diamond abrasive).

Figure 2:
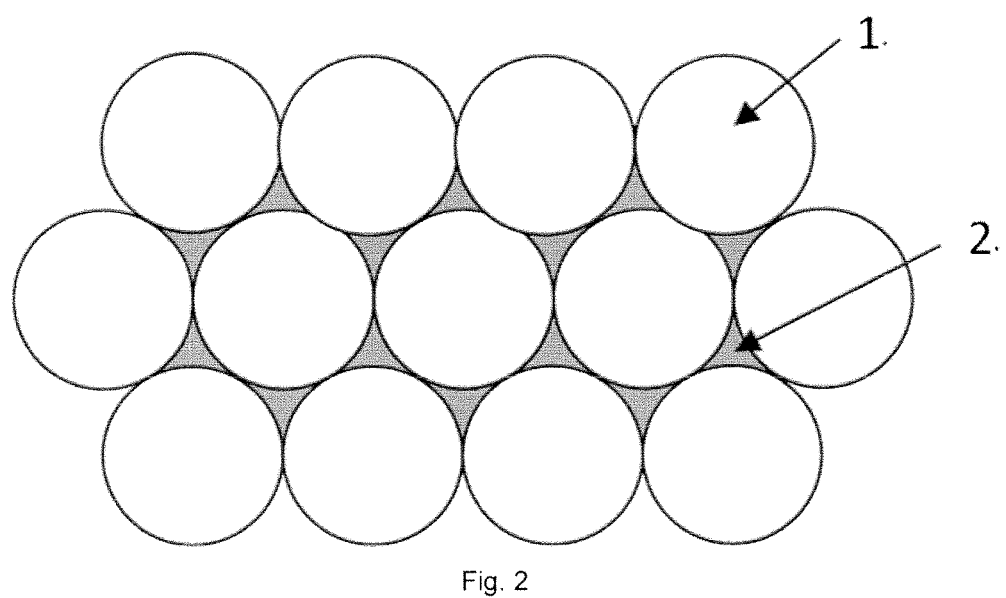
FIG. 2 is a schematic diagram of distribution of the additive obtained in Example 1 in a composite binding agent, Wherein the legends are 1—skeleton material, 2—additive.

FIG. 2 is a schematic diagram of distribution of the additive in the composite binding agent. It can be seen from FIG. 2 that the additive shows uniformly diffused radial distribution of a submicron level in the composite binding agent, and the distribution of the additive in the superhard material product is also consistent. In FIG. 2, the skeleton material refers to a refractory component in the metal binding agent, and is a part of the composite binding agent.

The grinding wheel obtained in Example 1 is used for grinding of hard alloy, and the grinding effect thereof is as listed in Table 1, where Comparative Example 1 uses a diamond grinding wheel of bronze binding agent without the additive, and the rest is the same as that in Example 1.

Table 1 Comparison Table of Grinding Effects of the Grinding Wheel Obtained in Example 1

| Grinding Wheel | Strength (MPa) | Removal Rate (g/min) | Trimming Frequency (Kg each time) | Service Life of Grinding Wheel |
| --- | --- | --- | --- | --- |
| Comparative Example 1 | 280 | 3 | 2.5 | 30 |
| Example 1 | 260 | 4 | 4 | 42 |

EXAMPLE 2

An additive raw material composition for superhard material product in the present example consists of components of mass percentage as follows:

$Bi_2O_3$ 30%, $B_2O_3$ 40%, ZnO 10%, $SiO_2$ 5%, $Al_2O_3$ 3%, $Na_2CO_3$ 4%, $Li_2CO_3$ 4%, and $CaF_2$ 4%.

An additive for superhard material product in the present example is made from the above raw material composition, and a method for preparing the additive includes the steps of:

1) mixing $Bi_2O_3$, $B_2O_3$, ZnO, $SiO_2$, $Al_2O_3$, $Na_2CO_3$, and $Li_2CO_3$ of a formula ratio and evenly mixing them, then pouring the mixture in a quartz crucible, and placing the quartz crucible in a high-temperature resistance furnace to be heated at a rate of 10° C./min to 1300° C. and keeping the temperature for 1 hour to provide a mixture;

2) cooling the mixture obtained in Step 1) to 850° C. at a rate of 5° C./min, adding $CaF_2$ of the formula ratio to the mixture and stirring, and keeping the temperature for 2 hours to provide a sinter;

3) pouring the sinter obtained in Step 2) into cold water to be quenched to provide a bulk material; putting the obtained bulk material and ethanol, at a volume ratio of 1:3 of the material to ethanol, into a ball-mill tank to be ball-milled on a high-energy ball-milling machine for 50 hours, to obtain a powder, i.e. the additive, having a particle size of D90<200 nm (the particle size of the powder was detected via a laser particle analyzer).

The composite binding agent in the present example consists of a metal binding agent and the above additive. The content of mass percentage of the additive in the composite binding agent is 3.8%. The metal binding agent is a Co-based binding agent, and consists of components of mass percentage as follows: Co 64%, Cu 21%, Sn 10%, and WC 5%.

The grinding wheel in the present example was made by evenly mixing the above composite binding agent with a diamond abrasive, followed by pressing the mixture at 200 MPa into a semi-finished product, and then placing the semi-finished product in a corresponding mold to be subjected to sintering at 620° C. The weight of the additive is 3% of the total weight of the raw materials of the grinding wheel (the composite binding agent and the diamond abrasive).

The grinding wheel obtained in Example 2 is used for grinding of iron-based powder metallurgical workpiece, which is assembly line work, and the grinding effect thereof is as listed in Table 2, where Comparative Example 2 uses a diamond grinding wheel of Co-based binding agent without the additive, and the rest is the same as that in Example 2.

Table 2 Comparison Table of Grinding Effects of the Grinding Wheel Obtained in Example 2

| Grinding Wheel | Strength (MPa) | Processing Cycle Time (sec) | Trimming Frequency (piece each time) | Service Life of Grinding Wheel (piece) |
|---|---|---|---|---|
| Comparative Example 2 | 260 | 18 | 3200 | 28000 |
| Example 2 | 250 | 14 | 5800 | 42000 |

The composition of the additive raw material compositions for superhard material product in Examples 3-6 is as listed in Table 3.

Table 3 Composition of the Additive Raw Material Compositions for Superhard Material Product in Examples 3-6 (mass percentage)

| Component | Example 3 | Example 4 | Example 5 | Example 6 |
|---|---|---|---|---|
| $Bi_2O_3$ | 25% | 30% | 40% | 25% |
| $B_2O_3$ | 40% | 25% | 30% | 25% |
| ZnO | 5% | 19% | 5% | 25% |
| $SiO_2$ | 2% | 10% | 8% | 6% |
| $Al_2O_3$ | 8% | 2% | 5% | 10% |
| $NaCO_3$ | 1% | 5% | 3% | 2% |
| $LiCO_3$ | 3% | 1% | 5% | 2% |
| $MgCO_3$ | 5% | 3% | 1% | 3% |
| $CaF_2$ | 1% | 5% | 3% | 2% |

The additives for superhard material product in Examples 3-6 are made from the above raw material compositions, respectively. Technical parameters of preparing methods are as listed in Table 4, and the rest is the same with that in Example 1.

Table 4 Table of Parameters of Methods for Preparing the Additives for Superhard Material Product in Examples 3-6

| Step | Parameter | Example 3 | Example 4 | Example 5 | Example 6 |
|---|---|---|---|---|---|
| 1) | temperature being kept at, ° C. | 1200 | 1300 | 1400 | 1350 |
|  | temperature-keeping time, h | 3 | 2 | 1 | 1.5 |
| 2) | temperature being kept at, ° C. | 850 | 950 | 900 | 900 |
|  | temperature-keeping time, h | 2 | 1 | 1.5 | 1 |
| 3) | ball-milling time, h | 40 | 45 | 50 | 55 |

Composite binding agents in Examples 3-6 consist of the above additives and metal binding agents, respectively, and the rest is the same as that in Example 1. The grinding wheels in Examples 3-6 are made from the above composite binding agents and diamond abrasives, respectively, and the rest is the same as that in Example 1.

Grinding effects of the grinding wheels in Examples 3-6 are detected, and results are as listed in Table 5.

Table 5 Detection Results of Grinding Effects of the Grinding Wheels Obtained in Examples 3-6

| Grinding Wheel | Strength (MPa) | Removal Rate (g/min) | Trimming Frequency (Kg each time) | Service Life of Grinding Wheel (Kg) |
|---|---|---|---|---|
| Comparative Example 1 | 280 | 3 | 2.5 | 30 |
| Example 3 | 277 | 3.9 | 3.9 | 40 |
| Example 4 | 273 | 4 | 3.6 | 35 |
| Example 5 | 270 | 4.2 | 3 | 33 |
| Example 6 | 269 | 3.3 | 5 | 45 |

It can be seen from Table 5 that, while substantially maintaining the original strength, the grinding wheel products using the additive in the present invention have improved sharpness, service life, and grinding performance.

EXAMPLE 7

A self-sharpening diamond grinding wheel in the present example includes a grinding wheel substrate and an abrasive block, and the abrasive block is made from raw materials in a mass percentage as follows: Cu 28%, Sn 12%, Co 30%, Al 5%, Fe 3%, Cr 2%, Ti 2%, $MoS_2$ 3%, SG abrasive 2%, diamond 10%, and additive 3%.

The additive is made from raw materials in a mass percentage as follows: $Bi_2O_3$ 35%, $B_2O_3$ 35%, ZnO 10%, $SiO_2$ 5%, $Al_2O_3$ 3%, $Na_2CO_3$ 2%, $Li_2CO_3$ 4%, $MgCO_3$ 2%, and $CaF_2$ 4%.

A method for preparing the additive includes the steps of:

1) mixing $Bi_2O_3$, $B_2O_3$, ZnO, $SiO_2$, $Al_2O_3$, $Na_2CO_3$, $Li_2CO_3$, and $MgCO_3$ of a formula ratio and evenly mixing them, then pouring the mixture in a quartz crucible, and placing the quartz crucible in a high-temperature resistance furnace to be heated at a rate of 10° C./min to 1250° C. and keeping the temperature for 2 hours to provide a mixture;

2) cooling the mixture obtained in Step 1) to 850° C. at a rate of 5° C./min, adding $CaF_2$ of the formula ratio to the mixture and stirring, and keeping the temperature for 2 hours to provide a sinter;

3) pouring the sinter obtained in Step 2) into cold water (room temperature) to be quenched to provide a bulk material; putting the obtained bulk material and ethanol into a ball-mill tank to be ball-milled on a high-energy ball-milling machine for 60 hours, to obtain a powder, i.e. the additive, having a particle size of D90<200 nm.

A method for manufacturing the self-sharpening diamond grinding wheel in the present example includes the steps of:

a) mixing Cu powder, Sn powder, Co powder, Al powder, Fe powder, Cr powder, Ti powder, $MoS_2$ powder, SG abrasive, diamond and additive of a formula ratio, pouring them into a three-dimensional mixer to be mixed for 2 hours, to provide a mixture;

b) loading the mixture obtained in Step a) into a steel mold, shaving and flattening the mixture, and placing the steel mold on an oil hydraulic press to be pressed at a pressure of 150 MPa, to provide a semi-finished product.

c) loading the semi-finished product obtained in Step b) in a graphite mold, and placing the graphite mold in a hot pressing sintering machine in an air atmosphere to be sintered, specifically: heating up to 400° C. at a heating rate of 100° C./min and keeping the temperature for 2 min, to promote the complete melting of Sn with a low melting point, so as to perform alloying reaction, and then heating up to 600° C. at a heating rate of 50° C./min and keeping the temperature for 8 min; after completing the sintering, placing the mold in cold water (room temperature) to be quenched, to provide the abrasive block;

d) adhering the abrasive block obtained in Step c on a grinding wheel substrate to obtain the self-sharpening diamond grinding wheel.

EXAMPLE 8

A self-sharpening diamond grinding wheel in the present example includes a grinding wheel substrate and an abrasive block, and the abrasive block is made from raw materials in a mass percentage as follows: Cu 44%, Sn 10%, Co 25%, Al 3%, Fe 2%, Cr 1%, Ti 3%, $MoS_2$ 1%, SG abrasive 5%, diamond 5%, and additive 1%.

The additive is made from raw materials in a mass percentage as follows: $Bi_2O_3$ 25%, $B_2O_3$ 40%, ZnO 5%, $SiO_2$ 2%, $Al_2O_3$ 8%, $Na_2CO_3$ 1%, $Li_2CO_3$ 3%, $MgCO_3$ 5%, and $CaF_2$ 1%.

A method for preparing the additive includes the steps of:

1) mixing $Bi_2O_3$, $B_2O_3$, ZnO, $SiO_2$, $Al_2O_3$, $Na_2CO_3$, $Li_2CO_3$, and $MgCO_3$ of a formula ratio and evenly mixing them, then pouring the mixture in a quartz crucible, and placing the quartz crucible in a high-temperature resistance furnace to be heated at a rate of 10° C./min to 1300° C. and keeping the temperature for 1 hour to provide a mixture;

2) cooling the mixture obtained in Step 1) to 850° C. at a rate of 5° C./min, adding $CaF_2$ of the formula ratio to the mixture and stirring, and keeping the temperature for 2 hours to provide a sinter;

3) pouring the sinter obtained in Step 2) into cold water (room temperature) to be quenched to provide a bulk material; putting the obtained bulk material and ethanol into a ball-mill tank to be ball-milled on a high-energy ball-milling machine for 50 hours, to obtain a powder, i.e. the additive, having a particle size of D90<200 nm.

A method for manufacturing the self-sharpening diamond grinding wheel in the present example includes the steps of:

a) mixing Cu powder, Sn powder, Co powder, Al powder, Fe powder, Cr powder, Ti powder, $MoS_2$ powder, SG abrasive, diamond and additive of a formula ratio, pouring them into a three-dimensional mixer to be mixed for 3 hours, to provide a mixture;

b) loading the mixture obtained in Step a) into a steel mold, shaving and flattening the mixture, and placing the steel mold on an oil hydraulic press to be pressed at a pressure of 200 MPa, to provide a semi-finished product.

c) loading the semi-finished product obtained in Step b) in a graphite mold, and placing the graphite mold in a hot pressing sintering machine in an air atmosphere to be sintered, specifically: heating up to 450° C. at a heating rate of 100° C./min and keeping the temperature for 1 min, to promote the complete melting of Sn with a low melting point, so as to perform alloying reaction, and then heating up to 580° C. at a heating rate of 50° C./min and keeping the temperature for 10 min; after completing the sintering, placing the mold in cold water (room temperature) to be quenched, to provide the abrasive block;

d) adhering the abrasive block obtained in Step c on a grinding wheel substrate to obtain the self-sharpening diamond grinding wheel.

EXAMPLE 9

A self-sharpening diamond grinding wheel in the present example includes a grinding wheel substrate and an abrasive block, and the abrasive block is made from raw materials in a mass percentage as follows: Cu 25%, Sn 5%, Co 30%, Al 7%, Fe 1%, Cr 2%, Ti 1%, $MoS_2$ 2%, SG abrasive 6%, diamond 15%, and additive 6%.

The additive is made from raw materials in a mass percentage as follows: $Bi_2O_3$ 30%, $B_2O_3$ 25%, ZnO 19%, $SiO_2$ 10%, $Al_2O_3$ 2%, $Na_2CO_3$ 5%, $Li_2CO_3$ 1%, $MgCO_3$ 3%, and $CaF_2$ 5%. A method for preparing the additive is the same as that in Example 7.

A method for manufacturing the self-sharpening diamond grinding wheel in the present example includes the steps of:

a) mixing Cu powder, Sn powder, Co powder, Al powder, Fe powder, Cr powder, Ti powder, $MoS_2$ powder, SG abrasive, diamond and additive of a formula ratio, pouring them into a three-dimensional mixer to be mixed for 4 hours, to provide a mixture;

b) loading the mixture obtained in Step a) into a steel mold, shaving and flattening the mixture, and placing the steel mold on an oil hydraulic press to be pressed at a pressure of 170 MPa, to provide a semi-finished product.

c) loading the semi-finished product obtained in Step b) in a graphite mold, and placing the graphite mold in a hot pressing sintering machine in an air atmosphere to be sintered, specifically: heating up to 400° C. at a heating rate of 100° C./min and keeping the temperature for 1 min, to promote the complete melting of Sn with a low melting point, so as to perform alloying reaction, and then heating up to 620° C. at a heating rate of 50° C./min and keeping the temperature for 4 min; after completing the sintering, placing the mold in cold water (room temperature) to be quenched, to provide the abrasive block;

d) adhering the abrasive block obtained in Step c on a grinding wheel substrate to obtain the self-sharpening diamond grinding wheel.

EXAMPLE 10

A self-sharpening diamond grinding wheel in the present example includes a grinding wheel substrate and an abrasive block, and the abrasive block is made from raw materials in a mass percentage as follows: Cu 25%, Sn 20%, Co 20%, Al 5%, Fe 5%, Cr 3%, Ti 1%, $MoS_2$ 2%, SG abrasive 3%, diamond 7%, and additive 9%.

The additive is made from raw materials in a mass percentage as follows: $Bi_2O_3$ 40%, $B_2O_3$ 30%, ZnO 5%, $SiO_2$ 8%, $Al_2O_3$ 5%, $Na_2CO_3$ 3%, $Li_2CO_3$ 5%, $MgCO_3$ 1%, and $CaF_2$ 3%. A method for preparing the additive is the same as that in Example 7.

A method for manufacturing the self-sharpening diamond grinding wheel in the present example includes the steps of:

a) mixing Cu powder, Sn powder, Co powder, Al powder, Fe powder, Cr powder, Ti powder, $MoS_2$ powder, SG abrasive, diamond and additive of a formula ratio, pouring them into a three-dimensional mixer to be mixed for 4 hours, to provide a mixture;

b) loading the mixture obtained in Step a) into a steel mold, shaving and flattening the mixture, and placing the steel mold on an oil hydraulic press to be pressed at a pressure of 160 MPa, to provide a semi-finished product.

c) loading the semi-finished product obtained in Step b) in a graphite mold, and placing the graphite mold in a hot pressing sintering machine in an air atmosphere to be sintered, specifically: heating up to 350° C. at a heating rate of 100° C./min and keeping the temperature for 3 min, to promote the complete melting of Sn with a low melting point, so as to perform alloying reaction, and then heating up to 610° C. at a heating rate of 50° C./min and keeping the temperature for 3 min; after completing the sintering, placing the mold in cold water (room temperature) to be quenched, to provide the abrasive block;

d) adhering the abrasive block obtained in Step c on a grinding wheel substrate to obtain the self-sharpening diamond grinding wheel.

EXAMPLE 11

A self-sharpening diamond grinding wheel in the present example includes a grinding wheel substrate and an abrasive block, and the abrasive block is made from raw materials in a mass percentage as follows: Cu 30%, Sn 5%, Co 35%, Al 10%, Fe 3%, Cr 3%, Ti 2%, $MoS_2$ 1%, SG abrasive 2%, diamond 5%, and additive 4%.

The additive is made from raw materials in a mass percentage as follows: $Bi_2O_3$ 25%, $B_2O_3$ 25%, ZnO 25%, $SiO_2$ 6%, $Al_2O_3$ 10%, $Na_2CO_3$ 2%, $Li_2CO_3$ 2%, $MgCO_3$ 3%, and $CaF_2$ 2%. A method for preparing the additive is the same as that in Example 7.

A method for manufacturing the self-sharpening diamond grinding wheel in the present example includes the steps of:

a) mixing Cu powder, Sn powder, Co powder, Al powder, Fe powder, Cr powder, Ti powder, $MoS_2$ powder, SG abrasive, diamond and additive of a formula ratio, pouring them into a three-dimensional mixer to be mixed for 2 hours, to provide a mixture;

b) loading the mixture obtained in Step a) into a steel mold, shaving and flattening the mixture, and placing the steel mold on an oil hydraulic press to be pressed at a pressure of 180 MPa, to provide a semi-finished product.

c) loading the semi-finished product obtained in Step b) in a graphite mold, and placing the graphite mold in a hot pressing sintering machine in an air atmosphere to be sintered, specifically: heating up to 450° C. at a heating rate of 100° C./min and keeping the temperature for 2 min, to promote the complete melting of Sn with a low melting point, so as to perform alloying reaction, and then heating up to 590° C. at a heating rate of 50° C./min and keeping the temperature for 8 min; after completing the sintering, placing the mold in cold water (room temperature) to be quenched, to provide the abrasive block;

d) adhering the abrasive block obtained in Step c on a grinding wheel substrate to obtain the self-sharpening diamond grinding wheel.

Self-sharpening diamond grinding wheels in Examples 12-16 use the abrasive blocks obtained in Examples 7-11 as the grinding blocks, respectively. It is also possible to omit the grinding wheel substrate.

EXPERIMENTAL EXAMPLE

In the present Experimental Example, functional performances of the self-sharpening diamond grinding wheels obtained in Examples 7-11 are detected, and results are as listed in Table 6.

A conventional grinding wheel is provided wherein raw materials of an abrasive block consist of components of mass percentage as follows: Cu 50%, Sn 25%, Co 15%, and diamond 10%; the manufacturing method for the conventional grinding wheel is the same as that in Example 4.

Table 6 Detection Results of Functional Performances of Self-sharpening Diamond Grinding Wheels Obtained in Examples 7-11)

| Item | Grinding Object | Trimming Mode | Trimming Time | Total Hours | Processing Amount | Spindle Motor Current Mean Value | Yield |
|---|---|---|---|---|---|---|---|
| Conventional grinding wheel | sapphire | manual trimming | 6 times/ 120 min | 60 h | 153 pieces | 35 A | 98.7% |
| Example 7 | sapphire | none | 0 | 60 h | 183 pieces | 33 A | 98.6% |
| Example 8 | sapphire | none | 0 | 60 h | 189 pieces | 34 A | 98.8% |
| Example 9 | sapphire | none | 0 | 60 h | 177 pieces | 28 A | 98.7% |
| Example 10 | sapphire | none | 0 | 60 h | 180 pieces | 27 A | 98.9% |
| Example 11 | sapphire | none | 0 | 60 h | 175 pieces | 29 A | 99.1% |

Notes:
the bigger a spindle motor current, the bigger a load.

It can be seen from Table 6 that since the diamond grinding wheels in Examples 7-11 have good self-sharpening ability, the trimming step is omitted, thus the trimming cost is saved, and the trimming time is transferred to the processing of the workpiece; during the same period of time, the processing amount is increased by about 17%, and the processing efficiency is improved; moreover, during the grinding process, the grinding load (resistance) is decreased, the sharpness of the grinding wheel is improved, and the yield is comparable. The detection results show that the diamond grinding wheels in the present invention have high self-sharpness, high strength, and high processing efficiency, is uniformly consumed during the grinding process, and do not need to be trimmed during the operational life cycle. Moreover, during the grinding process, they maintain good grinding force all the time, fundamentally solving the problems of long trimming time and high trimming cost of the conventional diamond grinding wheel, and possessing good economic benefit.

Although the invention has been described and illustrated with a certain degree of particularity with reference to a number of invention embodiments, it is understood that the present disclosure has been made only by way of example, and that numerous changes in the combination and arrangement of parts can be resorted to by those skilled in the art without departing from the spirit and scope of the invention, as hereinafter claimed.

The invention claimed is:

1. A method for preparing an additive for a superhard material product comprising steps of:
 1) mixing $Bi_2O_3$ 25%~40%, $B_2O_3$ 25%~40%, ZnO 5%~25%, $SiO_2$ 2%~10%, $Al_2O_3$ 2%~10%, $NaCO_3$ 1%~5%, $Li_2CO_3$ 1%~5%, and $MgCO_3$ 0%~5% in mass percentages, heating up to 1200~1400° C. and keeping temperature for 1~3 h to provide a mixture;
 2) cooling the mixture obtained in Step 1) to 850~950° C., adding $CaF_2$ 1%~5% in mass percentages of the formula ratio and mixing, and keeping temperature for 1~2 h to provide a sinter;
 3) quenching the sinter obtained in Step 2) and then crushing the quenched sinter to have a particle size of D90<200 nm to provide the additive, wherein the additive has a microcrystalline structure.

2. The method for preparing the additive according to claim 1, wherein in Step 1), a rate of raising the temperature is 8~12° C./min; and in Step 2), a rate of cooling is 4~6° C./min.

3. The method for preparing the additive according to claim 1, wherein in Step 3), the quenching refers to quenching the obtained sinter in water, to provide a bulk material.

4. The method for preparing the additive according to claim 3, wherein the crushing refers to mixing the obtained bulk material with ethanol to provide a mixture and ball-milling the mixture.

* * * * *

UNITED STATES PATENT AND TRADEMARK OFFICE
CERTIFICATE OF CORRECTION

PATENT NO. : 10,391,612 B2
APPLICATION NO. : 15/561143
DATED : August 27, 2019
INVENTOR(S) : Ning Yan et al.

It is certified that error appears in the above-identified patent and that said Letters Patent is hereby corrected as shown below:

On the Title Page

Item (73), Assignee's full name should be:
ZHENGZHOU RESEARCH INSTITUTE FOR ABRASIVES & GRINDING CO., LTD.

Signed and Sealed this
Twenty-third Day of June, 2020

Andrei Iancu
*Director of the United States Patent and Trademark Office*